J. F. BARKER.
WAVE MOTOR.
APPLICATION FILED JULY 31, 1911.

1,020,340.

Patented Mar. 12, 1912.
2 SHEETS—SHEET 1.

Witnesses:

Inventor:
J. F. Barker
by his Attorneys,

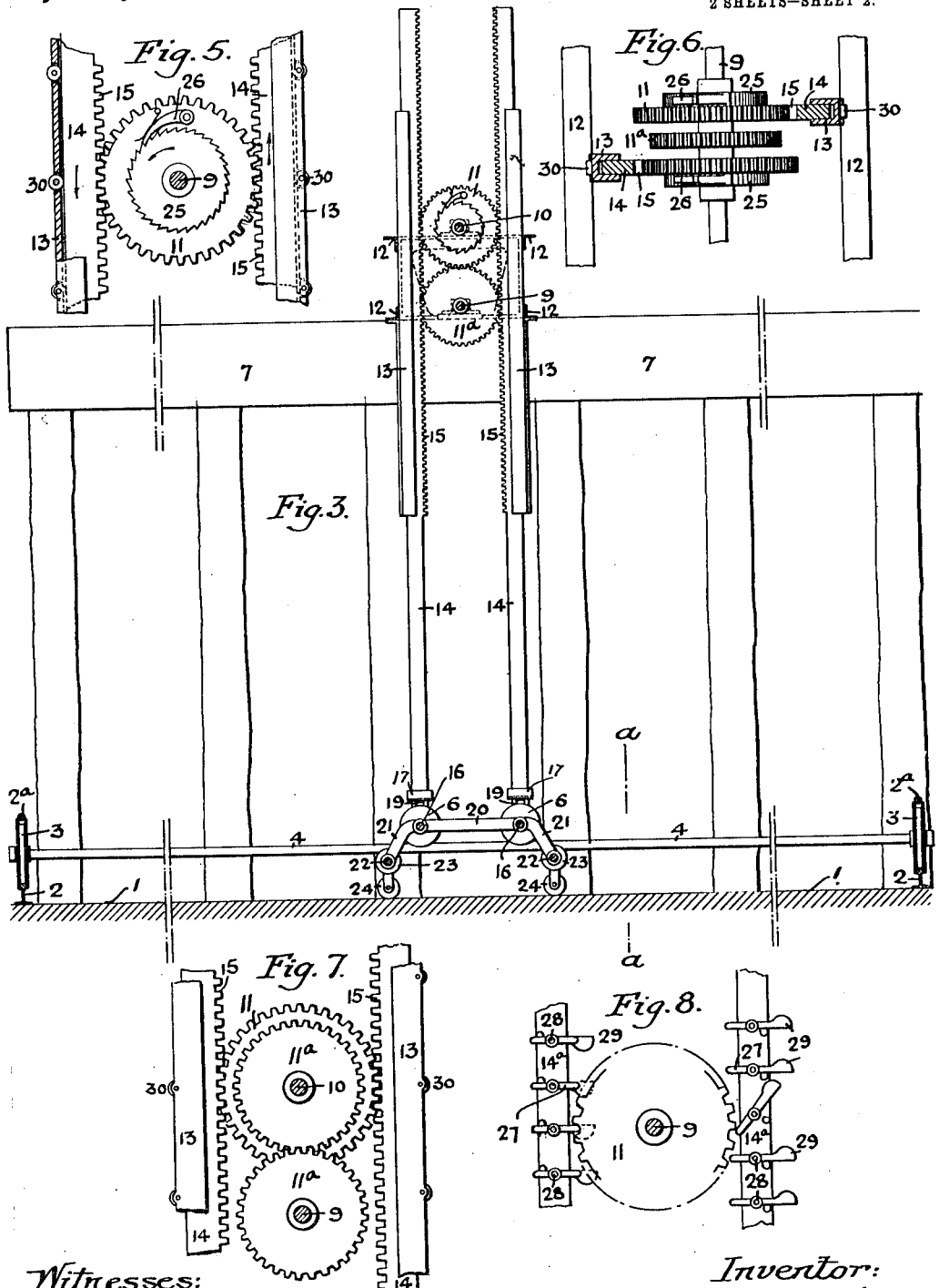

UNITED STATES PATENT OFFICE.

JAMES FREDERICK BARKER, OF PHILADELPHIA, PENNSYLVANIA.

WAVE-MOTOR.

1,020,340.  Specification of Letters Patent.  Patented Mar. 12, 1912.

Application filed July 31, 1911. Serial No. 641,627.

*To all whom it may concern:*

Be it known that I, JAMES FREDERICK BARKER, a citizen of the United States, residing in Philadelphia, Pennsylvania, have invented certain Improvements in Wave-Motors, of which the following is a specification.

My invention relates to that type of motor designed to be operated by the power of waves, and the object of my invention is to provide a structure which may be mounted upon or connected to an anchored pontoon, float or boat hull adjacent a wharf or pier, or a pair of the latter, upon which is mounted power delivering mechanism operated by said wave motor.

A further object of my invention is to provide a power delivering structure fixed against movement with respect to the wharf or pier, and operating means for such power delivering structure fixed against all movement except vertical and so connected to the pontoon, float or boat hull that the latter may move longitudinally or laterally (within certain limits) in addition to its rising and falling movements and those movements which may take place in several directions at the same time, without affecting the stated fixed condition of the operating structure.

Figure 1:
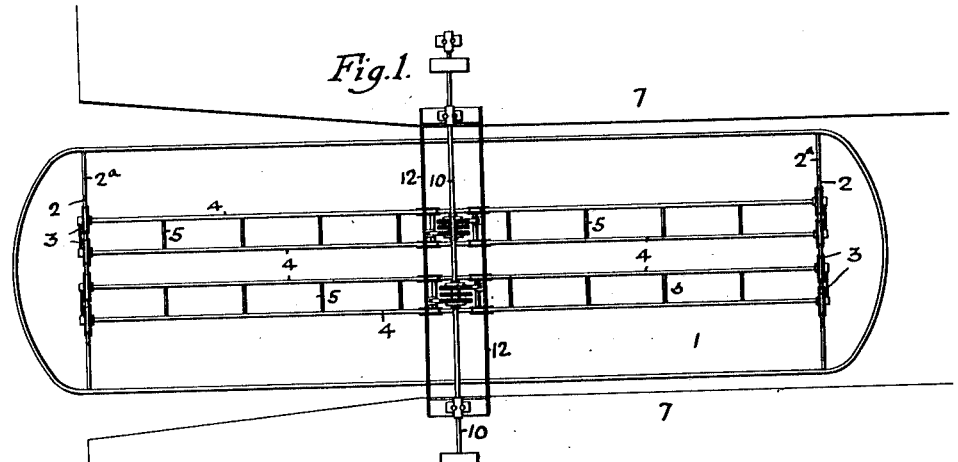
Figure 2:
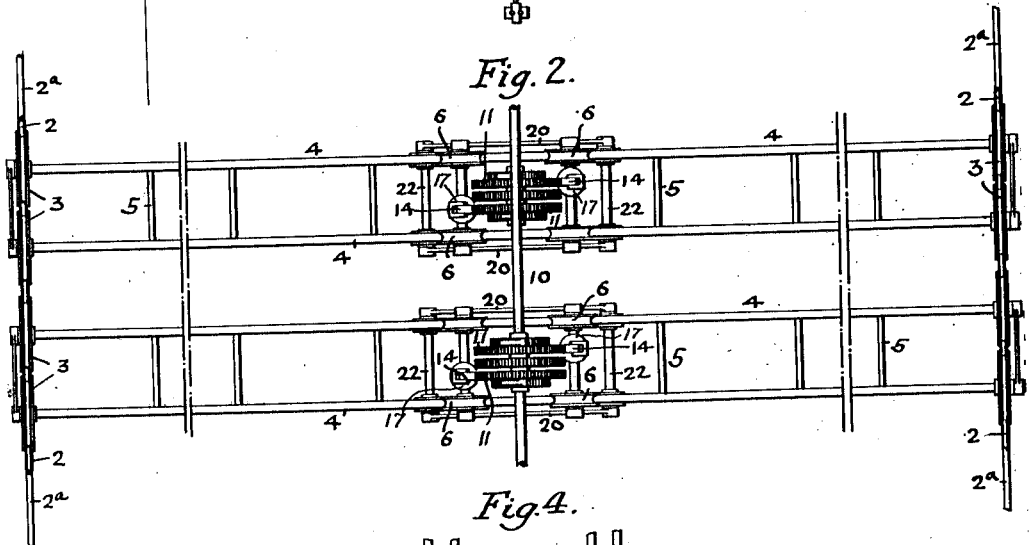
Figure 4:
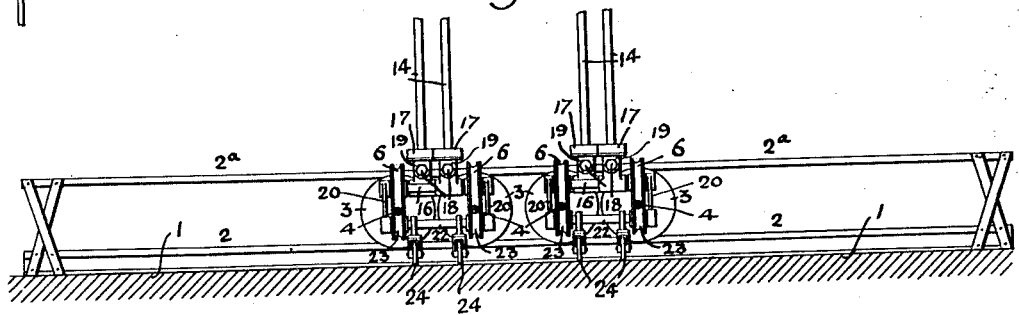

These and other features of my invention will be more fully described hereinafter; reference being had to the accompanying drawings, in which:

Figure 1, is a plan on a reduced scale of an improved wave motor embodying my invention; Fig. 2, is an enlarged plan view of part of the structure; Fig. 3, is a side elevation, partly in section; Fig. 4, is a sectional view on the line *a—a*, Fig. 3, and Figs. 5, 6, 7, and 8, are views illustrating details of my invention.

In the drawings, 1 represents a suitable pontoon, float or boat hull, which may have rails 2 extending across the ends of the same, to which wheels 3 are adapted; said wheels supporting the driving means for the motor or power transmitting apparatus. To prevent the wheels 3 leaving the rails, guard rails 2ª may be disposed above the same. The wheels 3 are suitably journaled on the ends of longitudinal axles or rods 4, suitably spaced apart; which rods may be braced by bars 5, or other suitable means, in their spaced positions, and these rods or axles in turn form rails for a series of wheels 6 carrying the driving means.

The pontoon, float or boat hull may be disposed adjacent or between a pair of pier structures 7, carrying suitable bearings or journals 8, for a shaft 9, or for a pair of shafts 9 and 10, respectively, which shaft (or shafts) may carry a series of gear wheels 11, and ratchet wheels keyed or otherwise secured thereto in the positions indicated; said gear wheels being directly engaged by the driving means.

When two shafts are employed, they are preferably geared together so that their movement will be in a certain measure controlled by, and in all instances will be consonant with, each other; supplemental gear wheels 11ª being employed for the purpose. These supplemental gear wheels may engage the main gear wheels 11 as shown in Fig. 3, or each shaft may carry a supplemental gear wheel for mutual engagement, as shown in Fig. 7.

The pier structure may be provided with suitable supports 12, carrying guides 13, for vertically movable rods 14, having teeth 15 forming racks for engagement with the main gear wheels 11. The rods 14 are supported by axles 16 carrying the wheels 6 adapted to the rods 4; universal couplings or connections being provided for said rods, comprising collars 17 mounted on said axles 16 and pivotally connected at 18 to yokes 19 carried by the ends of said rods. To provide against independent rise of said wheels 6, the axles of the same may be connected together by frames 20, having arms 21, in which shafts 22 may be journaled; said shafts carrying rollers 23 underlying the rods 4. The shafts 22 may also carry pivotally mounted caster wheels 24 adapted to move freely on the deck or surface of the pontoon, float or boat hull during the movements of the latter with respect to the driving mechanism. The gear wheels 11 engaged by said rack rods 14, are disposed adjacent ratchet wheels 25 keyed to the shaft 9 or the shafts 9 and 10, and said gear wheels are provided with suitable pawls 26 whereby upon movement of the wheels by engagement of their respective rack rod the shaft will be driven through the medium of the pawls and ratchet wheels. Upon movement of the respective rack rods in the opposite direction the gear wheels will be turned without affecting movement of the shaft. Each of said rods is racked for engagement with its respective gear wheel; such engagement being constant, and by suitably disposing the ratchet wheels carried by the respective shafts, and the pawls, the racks may be arranged to drive said gear wheels on the ascent of the same or the descent, or one rack, or pair of racks, may operatively engage on the ascent, and its companion rack, or pair of racks, may operatively engage on the descent. The motion thus imparted to said gear wheels 11 turns the shafts 8 and 9, and develops power which may be stored, or disposed of as desired.

Instead of providing rack rods with fixed teeth, I may provide rods 14$^a$, as shown in Fig. 8, having teeth in the form of pawls 27, pivoted to said rods at 28, and weighted at 29 so as to maintain normally a horizontal position. In such arrangement, the rods disposed on one side of the gear wheels will have their pawls disposed in one position, while the rods on the other side of said gear wheels will have their pawls disposed in the opposite position so that one rod (or pair of rods) with said pawls will move the wheel (or wheels) on the ascent, and the other rod (or pair of rods) will move the wheel (or wheels) on the descent of the same; the pawls of the opposite rack rod (or pair of rods) in each instance preventing movement of the gear wheels in the opposite direction.

It will be understood, of course, that the whole structure mounted upon the pontoon, float or boat hull maintains relatively the same position; excepting the wheels 3 mounted on the rails 2 and carried by the axles 4, which must move with the pontoon, boat hull or float when the latter moves in one direction, i. e. longitudinally. The rack rods, however, are substantially fixed in their positions; simply rising or falling in their guards or guides which guards or guides may be provided with rollers 30, as shown in Figs. 5, 6 and 7, to reduce friction of the moving parts.

It will be further understood that in some instances the rails 2 can be omitted, and that the wheels 3 can move, more or less freely, over the deck of the pontoon, float or boat hull.

I claim;—

1. In a wave motor, the combination of a floating hull or pontoon, a carriage adapted to move on the deck of said hull or pontoon, rails mounted on said carriage, a second carriage adapted to said rails, a shaft, and means carried by said second carriage for actuating said shaft.

2. In a wave motor, the combination of a floating hull or pontoon, a carriage adapted to move on the deck of said hull or pontoon, rails mounted on said carriage, a second carriage adapted to said rails, a shaft, a gear wheel on said shaft, and a rack carried by said second carriage in engagement with said gear wheel to drive said shaft.

3. In a wave motor, the combination of a floating hull or pontoon, rails forming a track thereon, a carriage adapted to said track, rails mounted on said carriage, a second carriage adapted to the rails of the first carriage, a shaft, a gear wheel on said shaft, and a rack carried by said second carriage in engagement with the gear wheel to drive said shaft.

4. In a wave motor, the combination of a floating hull or pontoon, a carriage adapted to move on the deck of said hull or pontoon, rails supported by said carriage, a second carriage adapted to said rails, a shaft, a gear wheel on said shaft, and a movable rack in engagement with said gear wheel to drive the shaft, said rack being pivotally connected to said second carriage.

5. In a wave motor, the combination of a floating hull or pontoon, rails forming a track and extending across said hull, a carriage adapted to said rails, a second set of rails supported by said carriage, a second carriage adapted to said second set of rails, a shaft, a gear wheel on said shaft, and a movable rack pivotally connected to said second carriage and in engagement with said gear wheel to drive the shaft.

6. In a wave motor, the combination of a floating hull or pontoon, a carriage adapted to move on the deck of said hull or pontoon, rails mounted on said carriage, a second carriage adapted to said rails, a pier or wharf, a shaft suitably journaled and supported by said pier or wharf over said floating hull, and means carried by said second carriage for actuating said shaft.

7. In a wave motor, the combination of a floating hull or pontoon, a carriage adapted to move on the deck of said hull or pontoon, rails mounted on said carriage, a second carriage adapted to said rails, a pier or wharf, a shaft suitably journaled and supported by said pier or wharf over said floating hull, a gear wheel on said shaft, and a movable rack carried by said second carriage in engagement with said gear wheel to drive said shaft.

8. In a wave motor, the combination of a floating hull or pontoon, rails forming a track carried thereby, a carriage adapted to said rails, a second set of rails mounted on said carriage, a second carriage adapted to said latter rails, a pier or wharf, a shaft suitably journaled and supported by said pier or wharf over said floating hull, a gear wheel on said shaft, and a vertically movable rack carried by said second carriage in engagement with said gear wheel to drive said shaft.

9. In a wave motor, the combination of a floating hull or pontoon, a carriage movable in one relative direction on the deck of said hull or pontoon, rails mounted on said carriage, a second carriage disposed in a relatively fixed position and adapted to said rails whereby the first carriage may move with respect to said second carriage without affecting the relatively fixed position of said second carriage, a shaft, a gear wheel carried thereby, and a rack rod carried by said second carriage and adapted to engage said gear wheel to drive said shaft.

10. In a wave motor, the combination of a floating hull or pontoon, rails thereon, a carriage adapted to said rails and movable in one direction, rails mounted on said carriage, a second carriage disposed in a relatively fixed position and adapted to the rails of the first carriage whereby the latter may move with respect to said second carriage without affecting the relatively fixed position of said second carriage, a shaft, a gear wheel carried thereby, and a rack rod carried by said second carriage and adapted to engage said gear wheel to drive said shaft.

11. In a wave motor, the combination of a floating hull or pontoon, a carriage movable in one relative direction on the deck of said hull or pontoon, rails mounted on said carriage, a second carriage disposed in a relatively fixed position and adapted to said rails whereby the first carriage may move with respect to said second carriage without affecting the relatively fixed position of said second carriage, a shaft, a pier or piers supporting said shaft over the floating hull, a gear wheel carried by said shaft, and a rack rod pivotally connected to said second carriage and adapted to engage said gear wheel to drive the shaft.

12. In a wave motor, the combination of a floating hull or pontoon, rails thereon, a carriage adapted to said rails and movable in one direction, rails mounted on said carriage, a second carriage disposed in a relatively fixed position and adapted to the rails of the first carriage whereby the latter may move with respect to said second carriage without affecting the relatively fixed position of said second carriage, a shaft, a pier or piers supporting said shaft over the floating hull, a gear wheel carried by said shaft, and a rack rod pivotally connected to said second carriage and adapted to engage said gear wheel to drive the shaft.

13. In a wave motor, the combination of a floating hull or pontoon, a carriage movable thereon, rails mounted on said carriage, a second carriage adapted to said rails, a shaft, a gear wheel carried thereby, a rack rod carried by said second carriage and adapted to engage said gear wheel to drive said shaft, and a guide for said rack rod.

14. In a wave motor, the combination of a floating hull or pontoon, a carriage movable thereon, rails mounted on said carriage, a second carriage adapted to said rails, a shaft, a gear wheel carried thereby, a rack rod carried by said second carriage and adapted to engage said gear wheel to drive said shaft, guides for said rack rod, and friction reducing means carried by said guide.

15. In a wave motor, the combination of a floating hull or pontoon, a carriage movable in one relative direction on the deck of said hull or pontoon, rails mounted on said carriage, a second carriage disposed in a relatively fixed position and adapted to said rails whereby the first carriage may move with respect to said second carriage without affecting the relatively fixed position of said second carriage, a plurality of shafts, a plurality of gear wheels carried thereby, and a plurality of rack rods pivotally connected to said second carriage and adapted for engagement with said gear wheels to drive the shafts.

16. In a wave motor, the combination of a floating hull or pontoon, rails thereon, a carriage adapted to said rails and movable in one direction, rails mounted on said carriage, a second carriage disposed in a relatively fixed position and adapted to the rails of the first carriage whereby the latter may move with respect to said second carriage without affecting the relatively fixed position of said second carriage, a plurality of shafts, a plurality of gear wheels carried thereby, and a plurality of rack rods pivotally connected to said second carriage and adapted for engagement with said gear wheels to drive the shafts.

17. In a wave motor, the combination of a floating hull or pontoon, a carriage adapted to move on the deck of said hull or pontoon, rails mounted upon said carriage, a second carriage adapted to said rails, a shaft, a gear wheel on said shaft, a ratchet wheel carried by said shaft, means connecting the gear and ratchet wheels whereby movement of said gear wheel may be transmitted to the shaft, and means for actuating said gear wheel.

18. In a wave motor, the combination of a floating hull or pontoon, a carriage adapted to move on the deck of said hull or pontoon, rails mounted upon said carriage, a second carriage adapted to said rails, a shaft, a gear wheel on said shaft, a ratchet wheel carried by said shaft, a pawl carried by said gear wheel in engagement with said shaft, means connecting the gear and ratchet wheels whereby movement of said gear wheel may be transmitted to the shaft, and means for actuating said gear wheel.

19. In a wave motor, the combination of a floating hull or pontoon, a carriage adapted to move on the deck of said hull or pontoon, a shaft, and means carried by said carriage for actuating said shaft.

20. In a wave motor, the combination of a floating hull or pontoon, a carriage adapted to move on the deck of said hull or pontoon, a shaft, a gear wheel on said shaft, and a rack carried by said carriage in engagement with said gear wheel to drive said shaft.

21. In a wave motor, the combination of a floating hull or pontoon, a carriage adapted to move on the deck of said hull or pontoon, a shaft, a gear wheel on said shaft, and a plurality of racks carried by second carriage in engagement with the gear wheel to drive said shaft.

22. In a wave motor, the combination of a floating hull or pontoon, a carriage adapted to move on the deck of said hull or pontoon, a shaft, a gear wheel on said shaft, and a movable rack in engagement with said gear wheel to drive the shaft, said rack being pivotally connected to said carriage.

In testimony whereof, I have signed my name to this specification, in the presence of two subscribing witnesses.

JAMES FREDERICK BARKER.

Witnesses:
MURRAY C. BOYER,
WM. A. BARR.